July 23, 1968     EIICHI TAKANO     3,393,958
COMPACT ZOOM LENS CORRECTED OVER A LARGE RANGE OF MAGNIFICATION Filed April 15, 1964     2 Sheets-Sheet 1

SPHERICAL ABERRATION & SINUSOIDAL CONDITION (mm)

INVENTOR.
EIICHI TAKANO
BY
ATTORNEY

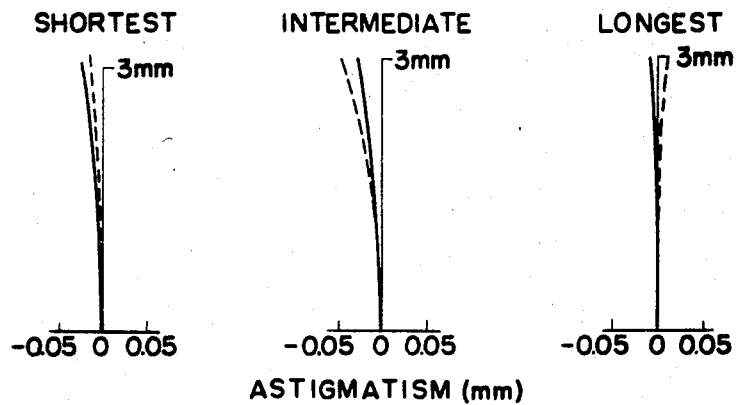
FIG. 3 — ASTIGMATISM (mm)
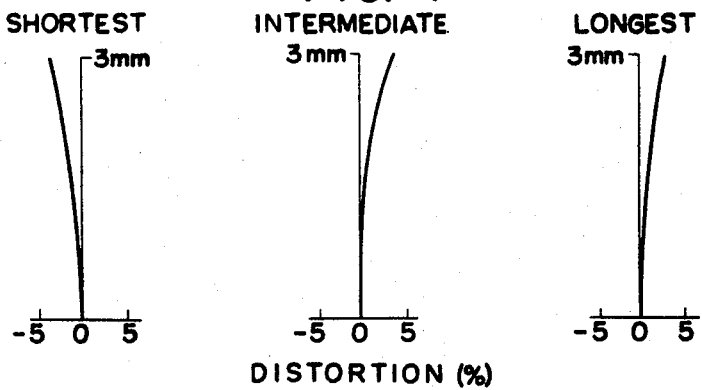
FIG. 4 — DISTORTION (%)
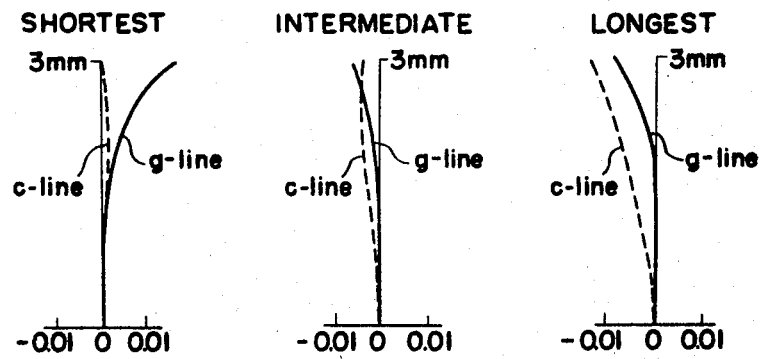
FIG. 5 — CHROMATIC ABERRATION (mm) UNDER MAGNIFICATION

United States Patent Office 3,393,958
Patented July 23, 1968

3,393,958
COMPACT ZOOM LENS CORRECTED OVER A LARGE RANGE OF MAGNIFICATION
Eiichi Takano, Tokyo, Japan, assignor to Canon Camera Kabushiki Kaisha, Tokyo, Japan, a corporation of Japan
Filed Apr. 15, 1964, Ser. No. 360,023
Claims priority, application Japan, Apr. 17, 1963, 38/19,678
1 Claim. (Cl. 350—176)

ABSTRACT OF THE DISCLOSURE

Compact zoom lens having a zooming ratio as large as 12 and a relative aperture as great as $f/1.8$, the lens being highly corrected over a large range of magnification with little variation in aberration upon zooming operation; the lens comprising four components, a first fixed convergent lens group, a second axially movable divergent zooming lens group, a third lens group moving axially corresponding to the axial movement of the second lens group to avoid movement of the paraxial image point and a fourth fixed and image forming lens group.

---

This invention relates to a zoom lens, and more particularly to a zoom lens highly corrected over a large range of magnification. An object of the invention is to provide miniaturized zoom lens highly corrected over a large range of magnification.

Another object of the invention is to provide a compact inexpensive zoom lens highly corrected over a magnification of at least ten to one.

Another object of the invention is to provide such a zoom lens which is of simple form and of a construction suitable for economical manufacture and which is capable of superior performance when used with photographic objectives having a relative aperture as great as $f/1.8$.

Further objects and advantages will be apparent in the details of construction and arrangement of parts as described in the specification hereafter taken together with the drawing, in which:

FIG. 3 depicts the graphs representing the correction for astigmatism and image curvature of the zoom lens at the wide, mean and telephoto positions;

FIG. 4 depicts the graphs representing the correction for distortion of the zoom lens at the wide, mean and telephoto position; and FIG. 5 depicts the graphs representing the correction for transverse chromatic aberrations at the wide, mean and telephoto positions.

It is to be understood that the terms "front" and "rear" as used hereinafter refer to the ends of the zoom lens respectively nearer the longer and shorter conjugates thereof.

The miniaturized zoom lens system in accordance with the present invention consists of four components: a fixed convergent component (I), an axially movable divergent zooming component (II), a component moving axially corresponding to the axial movement of said second component to avoid movement of the paraxial image point, and a fixed and image forming component (IV). The instant system satisfies the following two conditions:

(1) The first component composed of three positive members includes a cemented doublet of a negative and a positive lens, in which all the single positive lenses have Abbe numbers more than 55, and all the single negative lenses less than 30, satisfying the following conditions:

$$|\varphi_1 - \Phi_{1/3}| < 0.25 |\Phi_1|$$
$$|\varphi_2 - \Phi_{1/3}| < 0.25 |\Phi_1|$$
$$|\varphi_3 - \Phi_{1/3}| < 0.25 |\Phi_1|$$

and $$0 < X_1 < X_2 < X_3 < 0.5$$

wherein, the refractive power $\varphi$ and shape factor X of the three positive members are numbered, respectively, by subscripts in order from the front to rear, and the refractive power of the whole first component is designated by $\Phi_1$.

The shape factor X is defined as $$X = \frac{1/r_a + 1/r_b}{1/r_a - 1/r_b}$$

where $r_a$ and $r_b$ denote respectively the radii of curvature of the rear and front surfaces of the lens member. The definition and the meaning of the shape factor is disclosed in "Wave Theory of Abberation" by H. H. Hopkin, published by Oxford at the Clarendon Press, 1950, pages 119 through 121.

(2) The second component composed of three negative members including a cemented doublet of negative and positive lenses, in which all the negative lenses have Abbe numbers of more than 50, and all the positive lenses of less than 30, satisfies the following conditions:

$$|\varphi_4 - \Phi_{2/3}| < 0.1 |\Phi_2|$$
$$|\varphi_5 - \Phi_{2/3}| < 0.1 |\Phi_2|$$
$$|\varphi_6 - \Phi_{2/3}| < 0.1 |\Phi_2|$$

and $$-1.5 < X_4 < X_5 < X_6 < 0$$

wherein, the refractive power $\varphi$ and shape factor X of the three members are numbered, respectively, by subscripts in order from front to rear, and the refractive power of the whole second component is denoted by $\Phi_2$.

Figure 1:
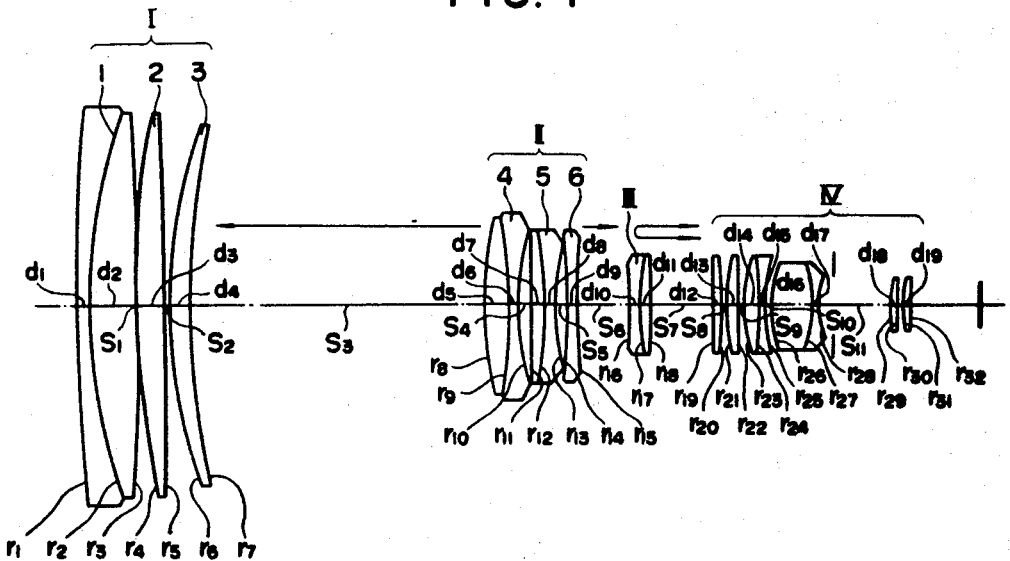
FIG. 1 is an optical diagram of one illustrative form of zoom lens constructed according to the invention.
Figure 2:
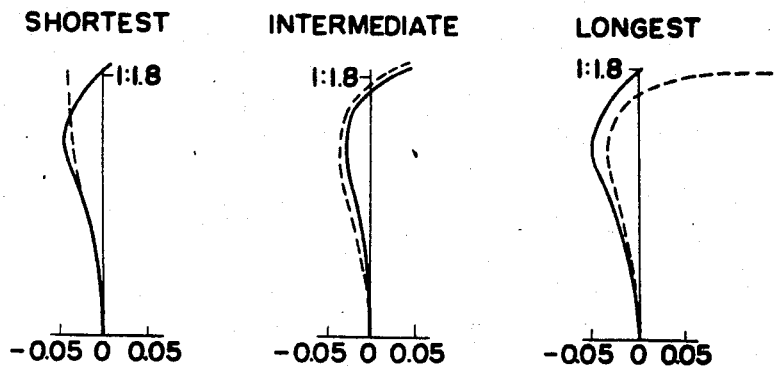
FIG. 2 depicts the graphs representing the correction for spherical aberrations and the deviation in the sine condition of the zoom lens shown in FIG. 1 at the wide, mean and telephoto positions.

FIG. 1 shows one embodiment according to the present invention, wherein (I), (II), (III) and (IV) denote the components comprising the whole system, 1, 2, and 3 the members comprsing the component (I), and 4, 5 and 6 those comprising component (II).

If a zoom lens system is miniaturized while maintaining its large zooming ratio, the focal lengths of every component would necessarily have to be shortened, whereby some deterioration in the correction of the aberrations would be caused. As a countermeasure against this, therefore, it is necessary to keep these focal lengths longer by widening the moving space of the movable component with the axial thicknesses of both said movable components, with those at the front and at the back of the same as thin as possible. On the other hand, to minimize variation in chromatic aberrations, each component should separately be achromatized, which accompanies a short radius of curvature of the cemented surface and an increase in said axial thicknesses of the components. Though this increase of the axial thickness contradicts the above mentioned countermeasure, observance of the Abbe numbers mentioned in the above conditions successfully eliminates these inconveniences and sufficiently improves the aberration correction.

Aberration variations during zooming operation are mostly caused by the first and second components, and to defeat such variations, the residual aberrations of both components must constantly be kept nearly equal but of the opposite sign, and, moreover, to decrease variation in higher order aberrations, which is caused by the combination of the third order aberrations caused by the third and fourth components as also by the first and second components, each of the first and second components should be separately well corrected. In such a zooming system having not only a zooming ratio as large as 12 but also a large aperture ratio, the incident point of the refractive surfaces of the marginal ray and the principal ray is greatly changed during zooming operation, and therefore the above mentioned expedients are particularly important for such a system. For such a zoom lens system having a large zooming ratio it is generally desired that when it is set at wide position, distortion and astigmatism, which are conspicuous in the edge of the image field, and when it is set at telephoto position, spherical and chromatic aberrations, which are significant in the center of the image field, are substantially highly corrected; the present inventive system having the first and second components respectively composed of three members, each of which has power and shape factors as defined in the above conditions, satisfactorily fulfills such essential and general requirements.

A preferred example of the zoom lens forming a specific embodiment of the invention, and having a magnification range of about twelve to one, is constructed in conformity with the following table wherein dimensions are in terms of millimeters, and the refractive indices for the sodium D-line and the Abbe dispersion numbers are respectively designated at $n$ and $v$, the radii $r$, thicknesses $d$, spaces $s$, effective focal length F, and aperture ratio $f$, are numbered, respectively, by subscripts in order from front to rear.

FIGS. 2, 3, 4, and 5 show respectively the aberration curves for the spherical aberrations, astigmatism, distortion, and chromatic aberrations at the shortest (6.5 mm.), intermediate (30 mm.), and longest (75 mm.) focal lengths in the above mentioned embodiment, which provides an excellent quality of zoom lens system according to this invention.

While the invention is thus described, it is not limited to the precise values given, any change may be readily made without departing from the spirit of the invention.

What I claim is:

1. A zoom lens comprising four components: a first convergent component, a second axially movable divergent zooming component, a third component moving axially corresponding to the axial movement of the second component to avoid movement of the paraxial image point and a fourth fixed and image forming component, the lens being constructed in substantial compliance with the following table where the dimensions are given in millimeters, and proceeding from the front to the rear $r_1$ to $r_{32}$ designate the radii of curvature of the surface, $d_1$ to $d_{19}$ the axial thicknesses, $s_1$ to $s_{12}$ the axial separations, $n_1$ to $n_{19}$ the indices of the indices of refraction for the sodium D-line and $V_1$ to $V_{19}$ the Abbe dispersion numbers; the numerical values of $S_3$, $S_6$, and $S_7$, represent, respectively, the spacings between the first, second, third, and fourth components for three positions of the movable components as they are moved to provide at least minimum, intermediate, and maximum magnifications.

F 6.5-75    $f$ 1-1.8

$$\begin{cases} r_1 = 356.99 \\ \quad d_1 = 1.2 \\ r_2 = 61.66 \\ \quad d_2 = 6.7 \\ r_3 = -602.28 \end{cases} \quad \begin{matrix} n_1 = 1.7552 \\ \\ n_2 = 1.713 \end{matrix} \quad \begin{matrix} v_1 = 27.5 \\ \\ v_2 = 53.9 \end{matrix}$$

$s_1 = 0.1$ $$\begin{cases} r_4 = 152.45 \\ \quad d_3 = 3.0 \\ r_5 = \infty \end{cases} \quad n_3 = 1.62041 \quad v_3 = 60.3$$

$s_2 = 0.1$ $$\begin{cases} r_6 = 66.54 \\ \quad d_4 = 3.4 \\ r_7 = 178.931 \end{cases} \quad n_4 = 1.62041 \quad v_4 = 60.3$$

$s_3 = 1.152\text{-}38.364\text{-}49.553$ $$\begin{cases} r_8 = 92.98 \\ \quad d_5 = 2.9 \\ r_9 = -46.07 \\ \quad d_6 = 0.6 \\ r_{10} = 30.0 \end{cases} \quad \begin{matrix} n_5 = 1.80518 \\ \\ n_6 = 1.78595 \end{matrix} \quad \begin{matrix} v_5 = 25.5 \\ \\ v_6 = 50.6 \end{matrix}$$

$s_4 = 1.7$ $$\begin{cases} r_{11} = \infty \\ \quad d_7 = 2.0 \\ r_{12} = -43.8 \\ \quad d_8 = 0.6 \\ r_{13} = 36.73 \end{cases} \quad \begin{matrix} n_7 = 1.80518 \\ \\ n_8 = 1.78595 \end{matrix} \quad \begin{matrix} v_7 = 25.5 \\ \\ v_8 = 50.6 \end{matrix}$$

$s_5 = 2.5$ $$\begin{cases} r_{14} = -36.73 \\ \quad d_9 = 0.6 \\ r_{15} = 142.833 \end{cases} \quad n_9 = 1.62041 \quad v_9 = 60.3$$

$s_6 = 51.597\text{-}7.091\text{-}3.196$ $$\begin{cases} r_{16} = -24.48 \\ \quad d_{10} = 0.6 \\ r_{17} = 18.89 \\ \quad d_{11} = 1.8 \\ r_{18} = -2436.889 \end{cases} \quad \begin{matrix} n_{10} = 1.51633 \\ \\ n_{11} = 1.53256 \end{matrix} \quad \begin{matrix} v_{10} = 64.1 \\ \\ v_{11} = 46.0 \end{matrix}$$

$s_7 = 1.0\text{-}8.294\text{-}1.0$ $$\begin{cases} r_{19} = -411.24 \\ \quad d_{12} = 1.3 \\ r_{20} = -38.33 \end{cases} \quad n_{12} = 1.83481 \quad v_{12} = 42.9$$

$s_8 = 0.1$ $$\begin{cases} r_{21} = 38.33 \\ \quad d_{13} = 1.4 \\ r_{22} = 450.37 \end{cases} \quad n_{13} = 1.883 \quad v_{13} = 41.0$$

$s_9 = 0.1$ $$\begin{cases} r_{23} = 17.21 \\ \quad d_{14} = 2.5 \\ r_{24} = -54.57 \\ \quad d_{15} = 0.6 \\ r_{25} = 41.09 \end{cases} \quad \begin{matrix} n_{14} = 1.58313 \\ \\ n_{15} = 1.78472 \end{matrix} \quad \begin{matrix} v_{14} = 59.3 \\ \\ v_{15} = 25.7 \end{matrix}$$

$s_{10} = 0.1$ $$\begin{cases} r_{26} = 10.4 \\ \quad d_{16} = 5.65 \\ r_{27} = -25.05 \\ \quad d_{17} = 0.5 \\ r_{28} = 6.91 \end{cases} \quad \begin{matrix} n_{16} = 1.6393 \\ \\ n_{17} = 1.69895 \end{matrix} \quad \begin{matrix} v_{16} = 45.0 \\ \\ v_{17} = 30.0 \end{matrix}$$

$s_{11} = 9.6$ $$\begin{cases} r_{29} = 20.89 \\ \quad d_{18} = 1.0 \\ r_{30} = -99.62 \end{cases} \quad n_{18} = 1.62041 \quad v_{18} = 60.3$$

$s_{12} = 0.1$ $$\begin{cases} r_{31} = 23.94 \\ \quad d_{19} = 1.0 \\ r_{32} = \infty \end{cases} \quad n_{19} = 1.62041 \quad v_{19} = 60.3$$

Back focus = 9.233

(References on following page)

References Cited

FOREIGN PATENTS 1,325,487   3/1963   France.

DAVID H. RUBIN, *Primary Examiner.*
J. K. CORBIN, *Assistant Examiner.*